United States Patent Office 2,734,523
Patented Feb. 14, 1956

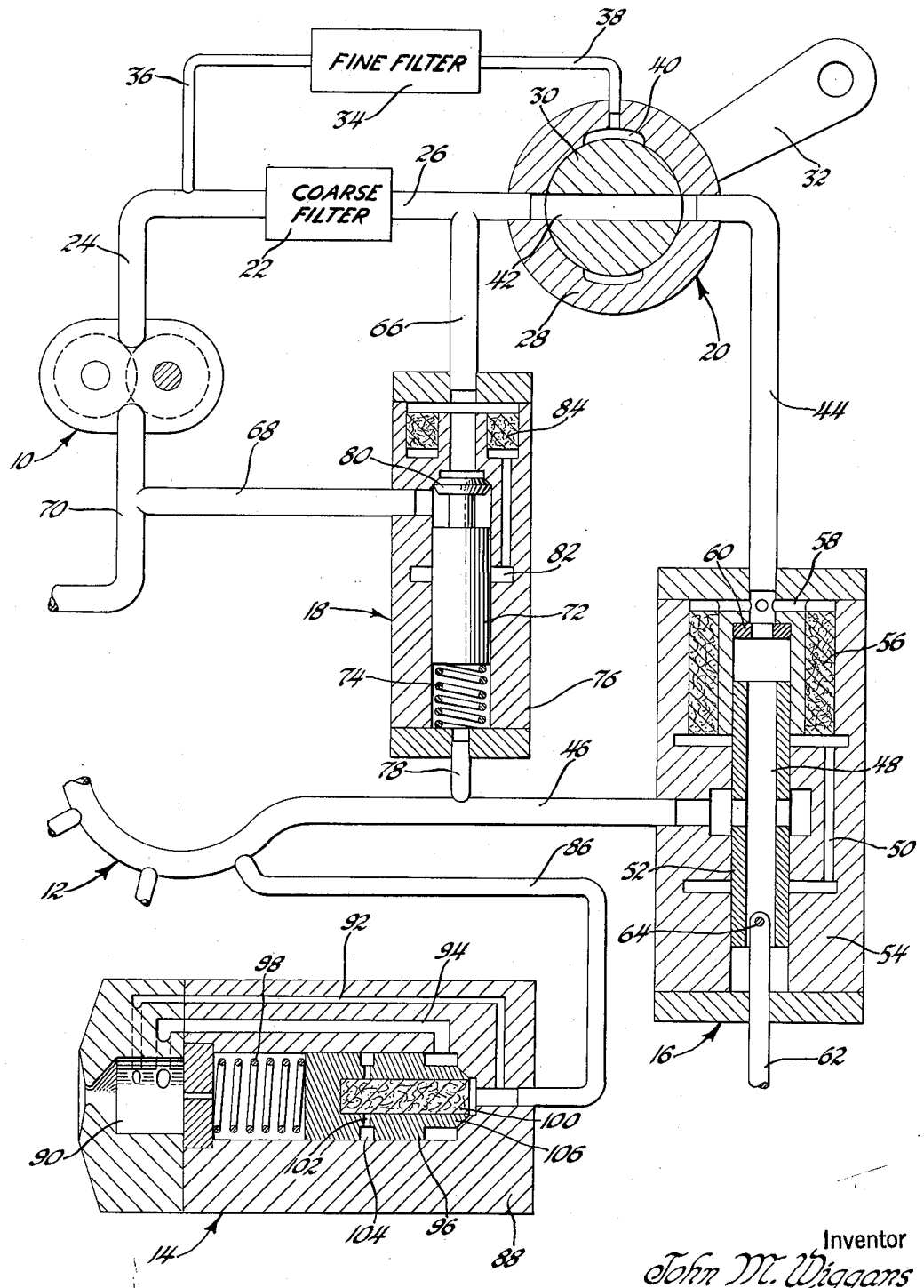

2,734,523

PROTECTIVE FILTERING SYSTEM

John M. Wiggans, Indianapolis, Ind., assignor to General Motors Corporation, Detroit, Mich., a corporation of Delaware Application July 24, 1952, Serial No. 300,630

2 Claims. (Cl. 137—238)

This invention relates to fluid flow control devices and more particularly to a protective filtering system for such devices.

Fluid transfer systems may include various types of fluid flow control devices having relatively movable parts that are subjected to contact with the fluid undergoing transfer, such as pumps, actuators, nozzles, and valves. The relatively movable parts of these devices are generally closely fitted to each other so that these parts are extremely vulnerable to the abrading effect of any finely particulated matter that is present in the fluid undergoing transfer.

An object of this invention is to prevent deleterious abrasions in fluid flow control devices in a simple and effective manner.

Another object of this invention is to prevent the wear and seizure of various fluid system elements such as nozzles, actuators, and valves, without adversely affecting the efficiency of operation of the fluid system.

The invention comprises the creation of a finely filtered flow of fluid between relatively movable members of the fluid system so as to keep the members free of particulate matter that is present in the fluid undergoing transfer.

The fluid may be gaseous or liquid and the particulate matter may be present as an impurity or as a desirable component. For example, the fluid may be a fuel that is contaminated by undesirable grit or it may be the carrier of a powdered solid fuel.

The invention is particularly advantageous when utilized in a hydraulic system that involves precision control of a large flow of liquid, such as the fuel system of a high power combustion engine. These systems include movable members that are so balanced as to be actuated by minute forces in which instance sticking or seizure as well as wear results from grit-like impurities in the liquid. The conventional method of preventing seizure and wear in these systems is to filter all of the liquid undergoing transfer. This method is inherently unsatisfactory when high flow rates are involved, for a filter fine enough to remove the smallest and most deleterious grit will greatly reduce the efficiency of liquid transfer because of the high pressure drops it imposes in the system.

In the practice of this invention the fluid undergoing transfer through a flow control device may be subjected to a restriction upstream of the relatively movable members of the flow control device and a negligible amount of the fluid may be led out of the main flow path at a point upstream of the restriction and introduced between the relatively movable members after being finely filtered.

Further objects and advantages of the present invention will be apparent from the following description, reference being had to the accompanying drawing wherein preferred embodiments of the invention are clearly shown. The drawing illustrates the invention as incorporated in a schematic representation of a liquid fuel system. The fuel system shown is typical of those used in gas turbine aircraft engines and the drawing includes only the major fuel control devices of the system. A fuel system such as indicated may deliver over 3,000 gallons of fuel per hour to a gas turbine engine at pressures in excess of 100 pounds per square inch absolute. Aircraft gas turbines burn various hydrocarbons ranging in grade from kerosene to high octane gasolines, and these fuels may be contaminated by grit-like impurities, such as rust and dirt. The invention is especially advantageous when applied to such a fuel system where the failure of an aircraft resulting from a seizure in the fuel system cannot be tolerated, and pumping losses such as will be experienced by finely filtering all of the fuel should be avoided if possible.

The drawing illustrates portions of a typical fuel system including a pump 10 that will supply fuel from a suitable reservoir, not shown, to a fuel distributing manifold 12 and its associated combustion chamber spray nozzles 14 (only one of which is shown) under the control of a throttling valve 16, a by-pass control valve 18, and a cut-off valve 20.

A coarse filter 22 is connected between the pump outlet line 24 and the cutoff valve inlet line 26 to remove any sizeable impurities from the main fuel flow path. The cutoff valve 20 includes a cylindrical housing 28 and a rotary valve plug 30 suitably actuated by a lever 32. The filter 22 is relatively coarse to prevent excessive pumping losses and therefore will not remove any minute grit as may be present in the fuel flowing in the main flow path. An exceedingly fine filter 34 is connected to the pump outlet line 24 by a line 36 upstream of the coarse filter 22 and by a line 38 to the cutoff valve 20 downstream of the coarse filter 22. The housing 28 is provided with a chamber 40 around the plug 30. The chamber 40 is supplied with finely filtered fuel from the line 38, which fuel is at practically pump outlet pressure inasmuch as its only means of escape is between the relatively movable rubbing surfaces of the housing 28 and plug 30. The pressure in the main flow path 42 through the cutoff valve 20 is less than pump outlet pressure as a result of the pressure losses imposed by the coarse filter 22. As a result of the pressure in the main flow path 42 being less than the pressure in the chamber 40, there will be a slight leakage of finely filtered fuel from the chamber 40 to the main flow path 42 between the rubbing surfaces of the plug 30 and the housing 28. This finely filtered flow of fuel will keep the rubbing surfaces of the cutoff valve 20 washed or bathed free of any grit-like impurities that may be present in the main flow path 42 and will thereby prevent wear and possible seizure of the plug 30 in the housing 28.

The cutoff valve 20 is connected by a line 44 to the throttling valve 16. The throttle valve 16 delivers a metered flow of fuel to the line 46 and includes a main flow path 48 and a negligible flow washing path 50. Metering of fuel through the valve 16 is accomplished by the reciprocation of the sleeve valve 52 in the housing 54 and a filter 56 is provided in the housing so that highly filtered fuel may be introduced between the rubbing surfaces of the sleeve and housing to keep them washed free of particulate impurities. The fine filter 56 is connected to the line 44 by passages 58 at a point upstream of a suitable pressure drop creating device which in this instance is a restricted orifice member 60. A rod 62 is pinned at 64 to the sleeve 52 to actuate the same. The actuating means for the rod 62 are not shown but in a typical gas turbine engine may include a manually operated linkage interconnected with various types of low force automatic actuators for temperature, pressure and speed corrections. The invention is especially valuable in such applications where low actuating forces render the fluid controlling devices highly vulnerable to seizure from particulate impurities.

The pressure regulating valve 18 is connected by a line 66 to the outlet side of the pump 10 and by a line 68 to the inlet line 70 of the pump. The valve 18 functions to maintain a constant pressure differential across the throttling valve 16 which pressure differential will be determined by the force that is imposed upon the piston 72 by the spring 74. The piston 72 is reciprocable in the housing 76 and is subjected on its underside to the discharge pressure of the throttle valve 16 by means of a line 78. The piston 72 actuates the valve disk 80 to by-pass various amounts of fuel around the pump 10 dependent upon the degree of throttling that is effected by the throttle valve 16. When the cutoff valve 20 is closed to shut off the delivery of fuel to the nozzle 14 the pressure regulating valve 18 will function as an ordinary pressure relief valve for the pump 10. The rubbing surfaces of the piston 72 and the housing 76 are bathed by a finely filtered flow of fuel that is supplied to the annular chamber 82 from the line 66 through the fine filter 84. The valve disk 80 will cause a slight drop in the pressure of the fuel flowing from line 66 to 68 and the throttle valve 16 will create a pressure drop between lines 66 and 78. Therefore, the fuel in the chamber 82 will be at a slightly higher pressure than the fuel in the line 68 and 78 so that the piston 72 will be continuously washed free of grit.

The spray nozzle 14 is connected to the manifold 12 of the line 46 by the line 86. The spray nozzle 14 includes a housing 88 having an outlet swirl chamber 90. The nozzle is of the duplex delivery type, that is, it is provided with a pair of delivery passages 92 and 94 leading to the swirl chamber 90. The passage 92 is primarily for starting and low capacity fuel delivery while the passage 94 delivers additional fuel in accordance with the position of the piston 96 which is biased to shutoff position by a spring 98. The rubbing surfaces of the piston 96 and the housing 88 are also provided with a finely filtered flow of washing fuel and in this instance the fine filter 100 is incorporated in the piston rather than in the housing. The piston 96 is provided with the radial passages 102 that lead from the filter 100 to an annular groove 104. The shutoff valve portion 106 of the piston 96 effects sufficient throttling between the lines 94 and 86 so that the pressure in the groove 104 is higher than the pressure in the passage 94 to thereby effect a washing flow of filtered fuel between the rubbing surfaces of the piston 96 and the housing 88.

The invention by its very nature subjects only a small percentage of the fluid undergoing transfer to fine filtration and this percentage may be readily varied in any particular installation by merely changing the size of the main fluid flow restrictors and/or the fit of the relatively movable control members.

The preferred embodiment of the invention has been described fully as applied to an aircraft gas turbine fuel system because the invention was conceived in an effort to overcome failures in such systems that were experienced as a result of impurities in the fuel. It should be obvious that the invention may be applied to any type of fluid transfer system wherein minute particulate matter is present in the fluid being transferred and wherein it is desirable to protect the flow control devices from the particulate matter.

In the preferred embodiment of the invention the separation of the particulate matter from the washing fluid is accomplished by the use of a conventional filter, but it should be understood that other methods of separating the particulate matter may be utilized according to the particular application in which the invention is incorporated.

The preferred embodiment of the invention has been described fully in order to explain the principles of the invention, and it is to be understood that modifications of structure may be made by the exercise of skill in the art within the scope of the invention which is not to be regarded as limited by the detailed description of the preferred embodiment.

I claim:

1. A valve mechanism comprising a casing having a valve chamber therein including an annular groove, a first passage for conducting a fluid to said chamber, a second passage for transferring said fluid from said chamber, a throttle valve movable in said chamber for controlling fluid flow through said chamber, said valve having rubbing surfaces coacting with said chamber on the outlet side of said valve, a third passage in said valve casing connecting with said first passage upstream of said valve and terminating at said annular groove adjacent said rubbing surfaces for conducting a portion of said fluid continuously and directly onto said rubbing surfaces and a filtering means in said third passage upstream of said rubbing surfaces, means biasing said valve against the inlet pressure to create a substantial pressure drop when said valve is open whereby there is at all times a pressure drop that will cause the fluid pressure in said chamber and in said second passage to be less than the fluid pressure in said third passage and said first passage so that the filtered portion of said fluid in said third passage will exclude the other portion of said fluid in said chamber from between said rubbing surfaces.

2. A valve mechanism comprising a casing having a valve chamber therein provided with a valve seat, inlet and outlet passages in said chamber for conducting a fluid through said chamber, a movable throttling valve member in said valve chamber including chamber rubbing surfaces downstream from said valve seat, a disc part coacting with said valve seat and an annular groove, said valve functioning as a flow restrictor so that, when said disc part of said valve is removed from said valve seat, a pressure drop will result with the fluid pressure in said inlet passage being greater than the fluid pressure in said chamber and outlet passages, a passage in said throttling valve member for conducting a portion of said fluid from said inlet passage directly onto said rubbing surfaces through said annular groove, and a filtering means in said valve passage, the filtered portion of said fluid being at a higher pressure for excluding the other portion of said fluid in said chamber and said outlet passage from between said rubbing surfaces.

References Cited in the file of this patent

UNITED STATES PATENTS

| 2,425,700 | Le Clair | Aug. 12, 1947 |
| 2,536,663 | Schaer | Jan. 2, 1951 |
| 2,536,896 | Wood | Jan. 2, 1951 |